(12) United States Patent
Davidson (10) Patent No.: US 11,503,961 B1
(45) Date of Patent: Nov. 22, 2022

(54) CUTTING BOARD

(71) Applicant: Toadfish LLC, Charleston, SC (US)

(72) Inventor: Casey Davidson, Charleston, SC (US)

(73) Assignee: Toadfish LLC, Charleston, SC (US)

( * ) Notice: Subject to any disclaimer, the term of this patent is extended or adjusted under 35 U.S.C. 154(b) by 0 days.

(21) Appl. No.: 17/385,447

(22) Filed: Jul. 26, 2021

Related U.S. Application Data (60) Provisional application No. 63/056,783, filed on Jul. 27, 2020.

(51) Int. Cl.
*A47J 47/00* (2006.01)
*B24D 15/08* (2006.01)

(52) U.S. Cl.
CPC ............ *A47J 47/005* (2013.01); *B24D 15/08* (2013.01)

(58) Field of Classification Search
CPC .............................. A47J 47/005; B24D 15/08
See application file for complete search history.

(56) References Cited

U.S. PATENT DOCUMENTS

| | | | |
|---|---|---|---|
| 6,971,644 B1* | 12/2005 | Kennedy | A47J 47/005 269/289 R |
| 11,077,575 B1* | 8/2021 | Carnegie | B26D 7/28 |
| 2017/0014001 A1* | 1/2017 | Lin | A47J 47/005 |

OTHER PUBLICATIONS

U.S. Appl. No. 63/056,783, filed Jul. 27, 2020 titled Cutting Board.

* cited by examiner

*Primary Examiner* — Nirvana Deonauth
(74) *Attorney, Agent, or Firm* — Middleton Reutlinger (57) ABSTRACT

Present embodiments relate to a cutting board. More specifically, but without limitation, the present embodiments, relate to foldable cutting boards.

13 Claims, 5 Drawing Sheets

CUTTING BOARD

CLAIM TO PRIORITY

This non-provisional patent application claims priority to and benefit of, under 35 U.S.C. § 119(e), U.S. Provisional Patent Application Ser. No. 63/056,783, filed Jul. 27, 2020 and titled "Cutting Board", all of which is incorporated by reference herein.

BACKGROUND

1. Field of the Invention

Present embodiments relate to a cutting board. More specifically, but without limitation, the present embodiments, relate to foldable cutting boards.

2. Description of the Related Art

Cutting boards for boating, fishing, and camping excursions can be difficult to pack due to the space limitations typically associated with camping and boating excursions. Additionally, current cutting boards are typically heavy wooden structures which also make packing, storing, or carrying difficult.

Current cutting boards on the market are awkward to carry due to their wide shape. The wide shape is necessary to have enough surface area to hold a large fish or game, but its shape makes storing them tough in kitchen drawers, tackle bags, boat boxes, or backpacks. It is difficult to find a storage compartment on a boat or in a camper to store the cutting board due to their overall size. Additionally, one cannot fit a full size cutting board into a back pack or tackle box when walking into a fishing or camping destination.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present cutting board provides a foldable function for ease for storage, during outdoor activities like boating and camping, for example. The foldable cutting board provides a plurality of sections which are pivotally connected in pairs, in order to provide the folding function, for example, in an accordion style. The cutting board may be unfolded into a flat substrate which allows for cutting, for example food cutting. The board may also include a knife sharpener for improved function during use. The board may also include rubber feet on the bottom to keep the board from slipping. The board may also include magnetic closures to lock the board together when folded up in the accordion style.

According to some embodiments, a foldable cutting board may comprise a plurality of cutting board sections, each of the plurality of cutting board sections having a peripheral edge defining a plurality of sides. Each of the plurality of cutting board sections may have a cutting surface and an opposed bottom surface. Pairs of the plurality of cutting board sections may have adjacent parallel sides, a hinge defined by a first linkage and a second linkage extending between opposite ends of adjacent of the pairs of the plurality of cutting board sections; and each of the first and second linkages pivotally connected to one of the pairs of the plurality of cutting board sections, wherein the plurality of cutting board sections are capable of folding in accordion fashion.

In some optional embodiments, the following features may be utilized with the foldable cutting board alone or in combination with other features. At least one foot on the bottom surface of each of the plurality of cutting board sections. At least one seat on the bottom surface of each of the plurality of cutting board sections. The at least one foot of one of the plurality of cutting board sections is opposite the at least one seat of the adjacent of the pair of the plurality of cutting board sections. The foldable cutting board may further comprise a knife sharpener. The knife sharpener may be a first and second knife sharpener. One of the plurality of cutting board sections may comprise a notch. The notch may be located along a peripheral edge of the foldable cutting board. The notch may receive the knife sharpener. The plurality of cutting board sections may comprise four sections.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a cutting board will now be described by way of examples. These embodiments are not to limit the scope of the claims as other embodiments of a cutting board will become apparent to one having ordinary skill in the art upon reading the instant description. Non-limiting examples of the present embodiments are shown in figures wherein:

DETAILED DESCRIPTION

It is to be understood that a cutting board is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

It would be desirable to provide a cutting board which can provide full functional length but may be reduced in size to make it easier to function for packing and storing. It would also be desirable to reduce the weight and/or size of known cutting boards so that the device may be carried more easily but also does not lose its functionality.

Further a cutting board would be desirable to allow for full length functionality when extended, but when folded-up can be stored or carried easily anywhere.

Referring now to FIGS. 1-5, the present cutting board provides a foldable function for ease of storage, during outdoor activities like boating and camping, for example. The foldable cutting board provides a plurality of sections which are pivotally connected in pairs, in order to provide the folding function in an accordion style. The cutting board may be unfolded into a flat substrate which allows for cutting, for example food cutting. The board may also include a knife sharpener for improved function during use.

Figure 1:
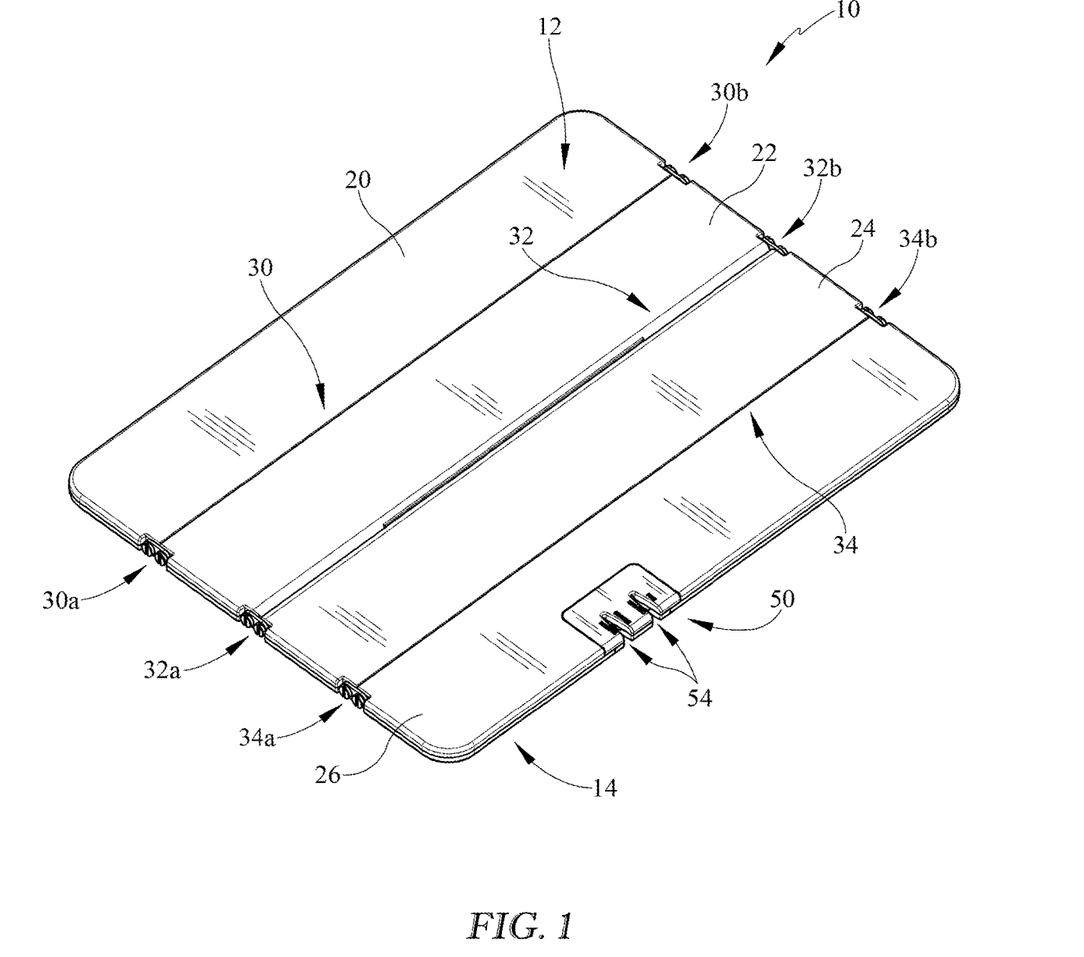
FIG. 1 is a perspective view of an example cutting board in an unfolded position.

Referring now to FIG. 1, a perspective view of a cutting board 10 is shown. The cutting board 10 is shown in an unfolded, extended position. The cutting board 10 formed by a plurality of cutting board sections 20, 22, 24, 26. While four cutting board sections 20, 22, 24, 26 are shown, there may be various numbers of sections depending on the overall size of the cutting board 10 and the shape of the cutting board 10. The depicted example is in the form of a rectangle but may be defined by alternate shapes such as square, circular, or other polygons—regular or irregular in shape.

The cutting board sections 20, 22, 24, 26 are each formed of a molded plastic however, other structures such as wood, or limited/no-porous materials may be used. The molded plastic defines an upper surface 12 and a bottom surface 14. The upper surface 12 and lower surface 14 may be of the same designs or may differ. The surfaces 12, 14 may have some texture molded into the surface to limit slipping of the food along the surface during cutting. Likewise, the cutting board 10 may be formed of a material which cannot absorb or otherwise retain any fluid from the food being prepared thereon, for example various plastics or woods may be used, along with other materials. Further for example, drain channels may be implemented for control of fluids, either or both of retention of controlled movement.

The rectangular shape of the cutting board 10 provides that the cutting board sections 20, 22, 24, 26 are all of the same shape, for example rectangular. Each of the cutting board sections 20, 22, 24, 26 has four sides, at least two of which define a peripheral edge of the cutting board 10.

The cutting board sections 20, 22, 24, 26 function in pairs in order to provide the accordion style folding. For example, sections 20 and 22 may pair together to define one hinge 30. Sections 22, 24 may pair together by pivotal connection to define a second hinge 32. For example, the first hinge 30 folds in a first direction, the second hinge 32 folds in a second direction. Similarly, sections 24, 26 are paired together by pivotal connection to define a third hinge 34. The second hinge 32 folds in a second direction, and the third hinge 34 folds in the first direction. In this non-limiting example, the three hinges 30, 32, 34 fold to allow the accordion style folding shown in FIG. 2.

The cutting board 10 also comprises a knife sharpener 50. It may be desirable to allow a user to sharpen one or more knives during the cutting process. This would typically require a separate sharpener, and is particularly difficult when camping or boating and space is limited. However, according to some embodiments, the cutting board 10 may include the sharpener 50 which is integrated with the cutting board 10. Specifically, as shown, the sharpener 50 may be disposed along an outer edge of the cutting board 10 and within a notch 52 of one of the outer edges of a cutting board section, for example cutting board section 26.

The sharpener 50 may be a single knife sharpener or may be a multiple knife sharpener as depicted. For example, the knife sharpener 50 comprises two slots 54 with sharpening structures. The knife sharpener 50, and cutting board 10, may be placed near an edge of a table or other supporting structure upon which the cutting board 10 is located. A knife blade may then be passed through one or both of the slots 54 in order to sharpen, without damage or otherwise engaging the structure below.

The knife sharpener 50 may be located on any perimeter edge of the cutting board 10. In the instant embodiment, the sharpener 50 is disposed on a long edge of one of the cutting board sections 26. The sharpener 50 may also be located on the opposite, perimeter long edge, or depending on the size, the sharpener 50 may be located along one of the perimeter short edges of the cutting board sections 20, 22, 24, 26.

Figure 2:
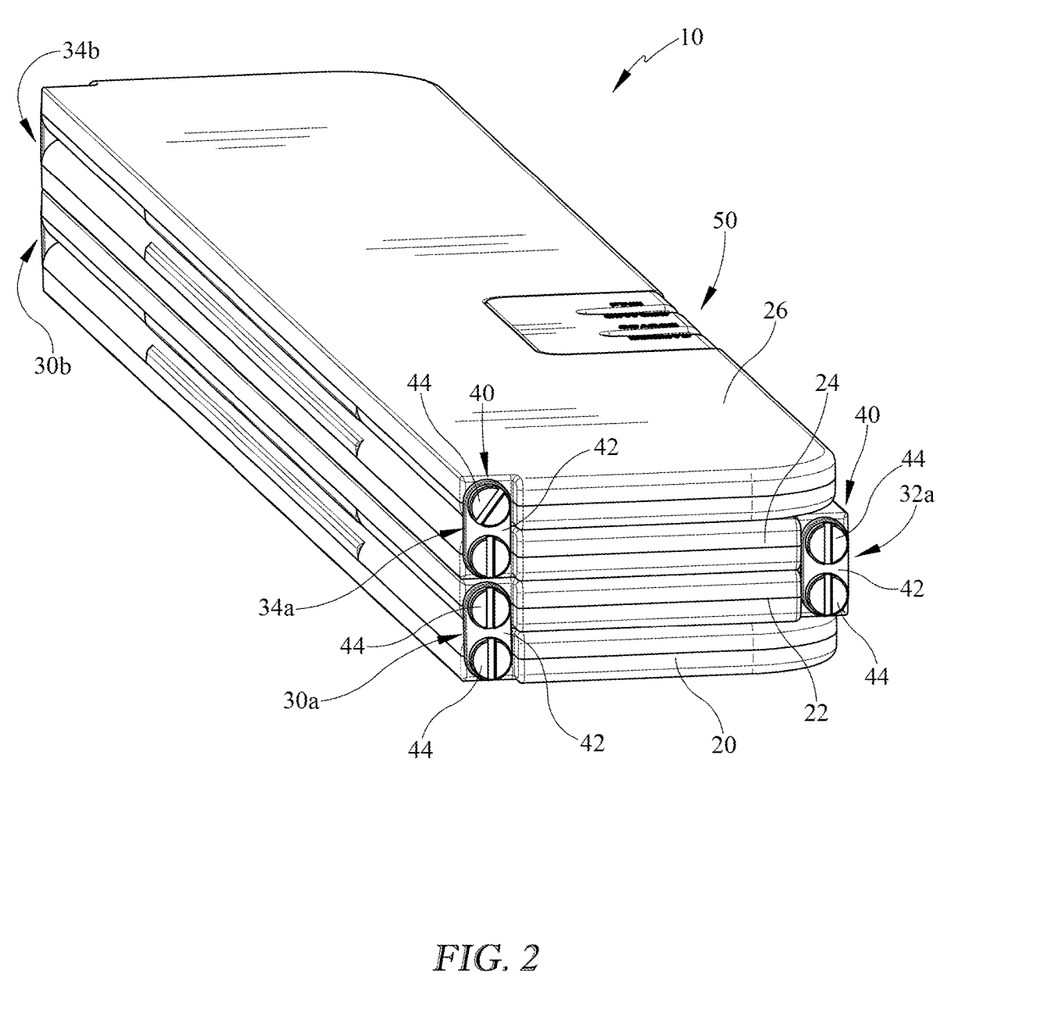
FIG. 2 is a perspective view of an example cutting board in a folded position.

With reference to FIG. 2, a perspective view of the cutting board 10 is shown in a folded position. The folded configuration is accordion-style meaning one hinge folds in a first direction, and a second hinge folds in a second opposite direction, wherein this pattern continues. Other hinge arrangements may be used for example wherein the hinges all fold in the same direction. The view also shows the hinges, in this view, hinges 30a, 30b, 32a, 34a, 34b. The cutting board sections 20, 22, 24, 26 each have a score 40 along ends of the sections 20, 22, 24, 26. As seen in the folded position, the scores 40 provide a clearance for, and function of, the hinges 30a, 30b, 32a, 34a, 34b.

The hinges 30a, 30b, 32a, 32b, 34a, 34b are formed by holes in the ends of the sections 20, 22, 24, 26 which are vertically aligned in pairs. The holes are not shown but are formed in the scores 40. Positioned over the holes are hinge linkages 42 which are also positioned in the scores 40. The linkages 42 extend in the scores 40 from one section to another, for example from section 20 to section 22, from section 22 to section 24, and from section 24 to section 26. The hinge linkages 42 may be held in place by fasteners 44, for example screws, rivets, or other structures which engage and allow pivoting. In the instant example, the fasteners 44 retain the linkages against the sections 20, 22, 24, 26.

The linkages 42 are pivotable relative to the sections 20, 22, 24, 26. Each linkage 42 may be a flat piece of material, having a pair of holes which align with the holes in the sections 20, 22, 24, 26. The linkage 42 may have rounded ends so not to bind with the adjacent material of the sections 20, 22, 24, 26. The linkages 42 are shown in FIG. 2 in a vertical orientation when the cutting board 10 is in a folded configuration. Alternatively, with additional reference to FIG. 3, the linkages 42 are oriented horizontally when the cutting board 10 is expanded.

Figure 3:
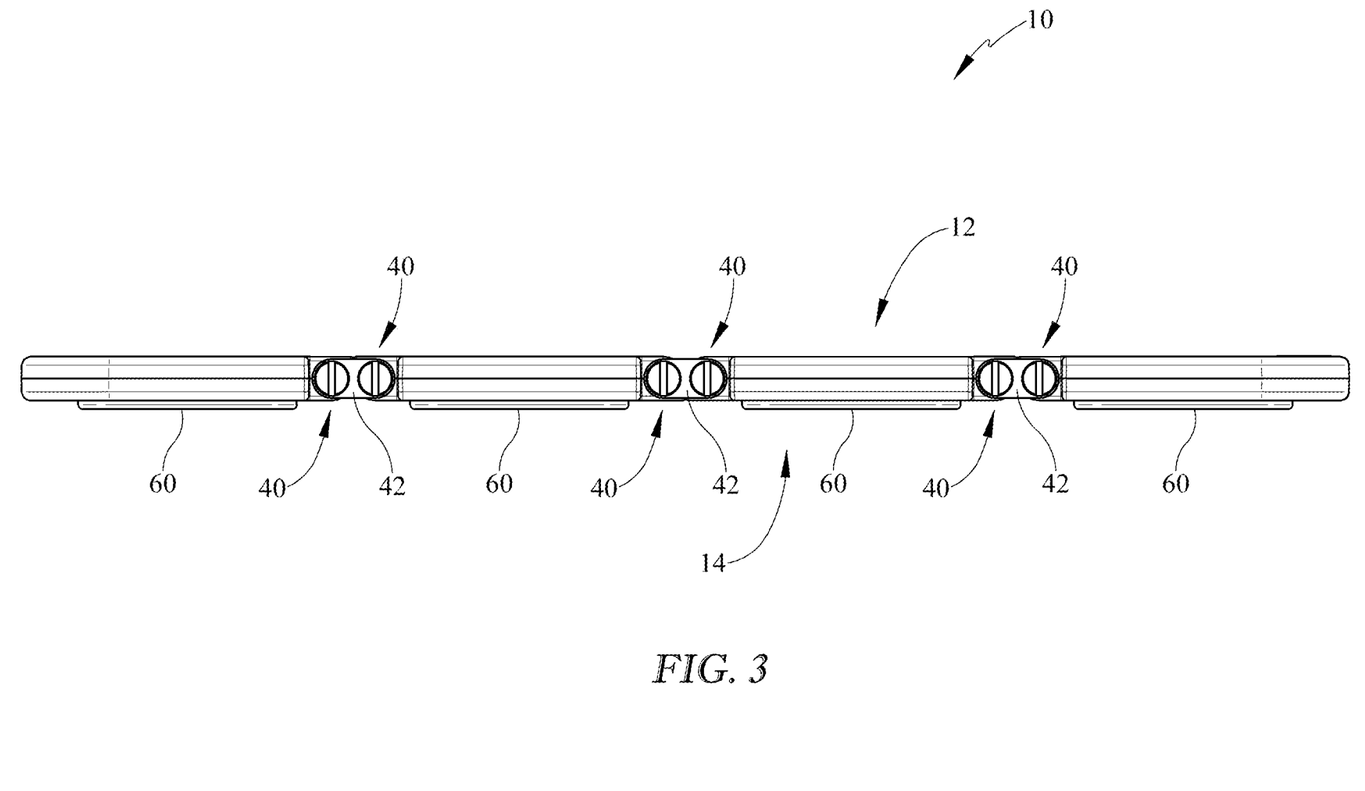
FIG. 3 is an end elevation view of the example cutting board of FIG. 1.

Referring now to FIG. 3, the scores 40 are shown in horizontal alignment when the cutting board 10 is unfolded and expanded. In this view, the upper surface 12 is generally flat providing a surface for food prep with limited gaps or spaces between the sections 20, 22, 24, 26. On the lower surface 14, a plurality of feet 60 are depicted. The feet 60 are spaced apart and located on each section 20, 22, 24, 26. In the example, there are three feet 60 on each section 20, 22, 24, 26. One foot 60 is shown on each section in this view, with the second and third behind the shown foot 60. However, the number of feet per section and in total may vary.

Figure 4:
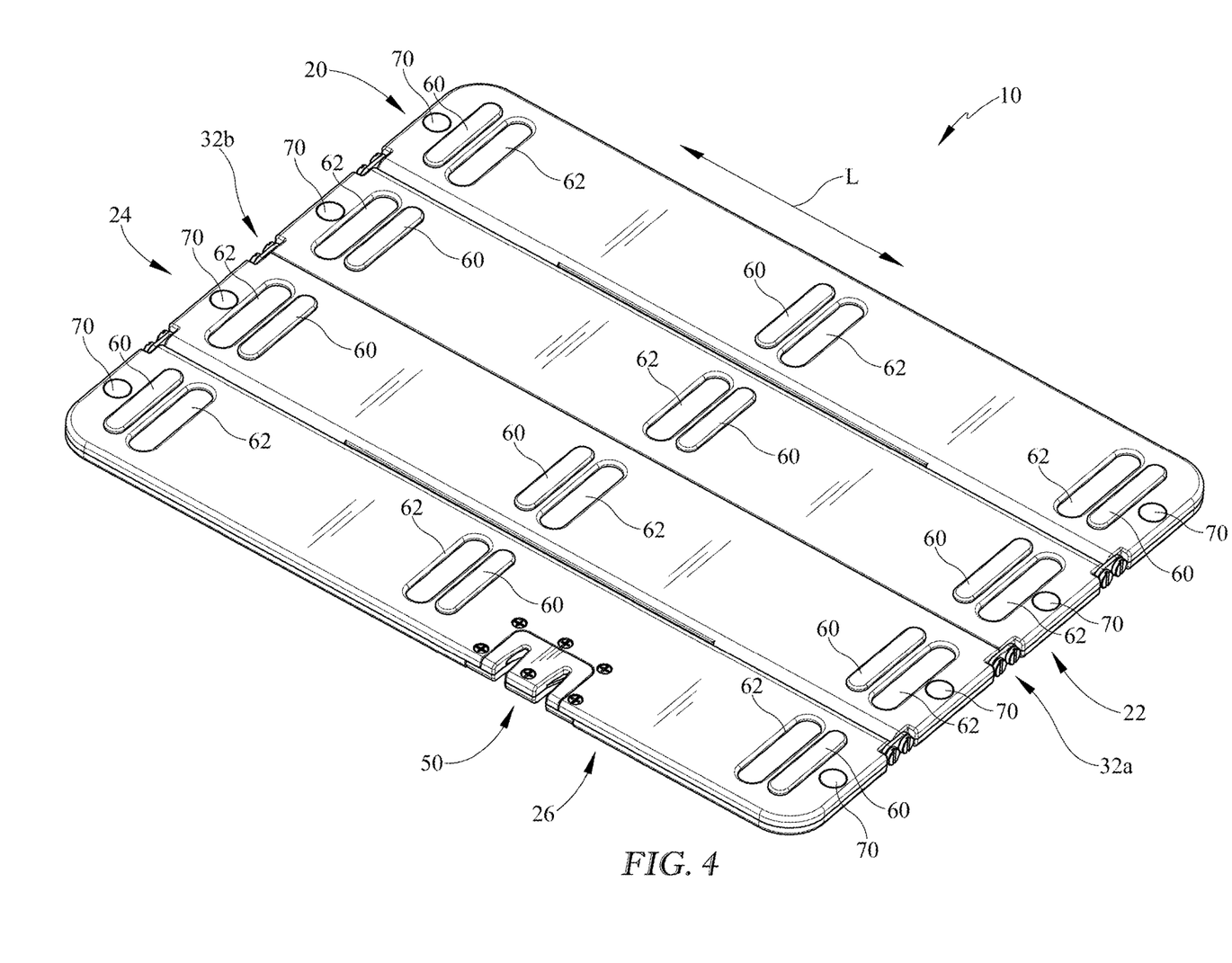
FIG. 4 is a perspective view of a bottom surface of the cutting board of FIG. 1; and, FIG. 5 is an exploded perspective detail view of the connection between the cutting board and a knife sharpener.

With further reference to FIG. 4, a perspective view of the bottom of the cutting board 10 is shown. The feet 60 are shown in this view of the bottom surface 14 of the cutting board 10. Each section 20, 22, 24, 26 comprises three feet 60 spaced apart along the long dimension L of the cutting board 10. Adjacent to each foot 60 along the long dimension L is a seat 62. Each seat 62 receives a foot 60 from an adjacent section 20, 22, 24, 26. In other words, the feet 60 of section 20 are received by the seat 62 of section 22. Likewise, the feet 60 of section 22 are received by the seat 62 of the section 20. The sections 24, 26 work similarly as the bottom surfaces of those sections fold toward one another. Alternatively, the central hinge 32a, 32b functions in such a direction that the bottom surfaces of the sections 22, 24 fold away from one another.

In this view, it is also shown that the adjacent edges of sections 20, 22 and sections 24, 26 are rounded or otherwise machined for clearance. The adjacent edges allow for closing of the sections 24, 26 and 22, 20 toward one another. As also shown, a sharp adjacent edge is shown between the sections 22, 24 because the direction of folding does not require clearance.

With this view, and in combination with FIG. 2, the magnetic elements 70 may be placed about the pairs of the plurality of sections, so that when the cutting board 10 is placed in the closed position (FIG. 2), the magnetic elements 70 maintain the sections 20, 22, 24, 26 in the closed position. The magnetic elements 70 are placed on the pairs of sections 20, 22, 24, 26 so that the elements 70 engage when the pairs close toward one another. This retains the cutting board in folded configuration. The magnetic elements 70 may be recessed so that the section surfaces are flush when closed.

Figure 5:
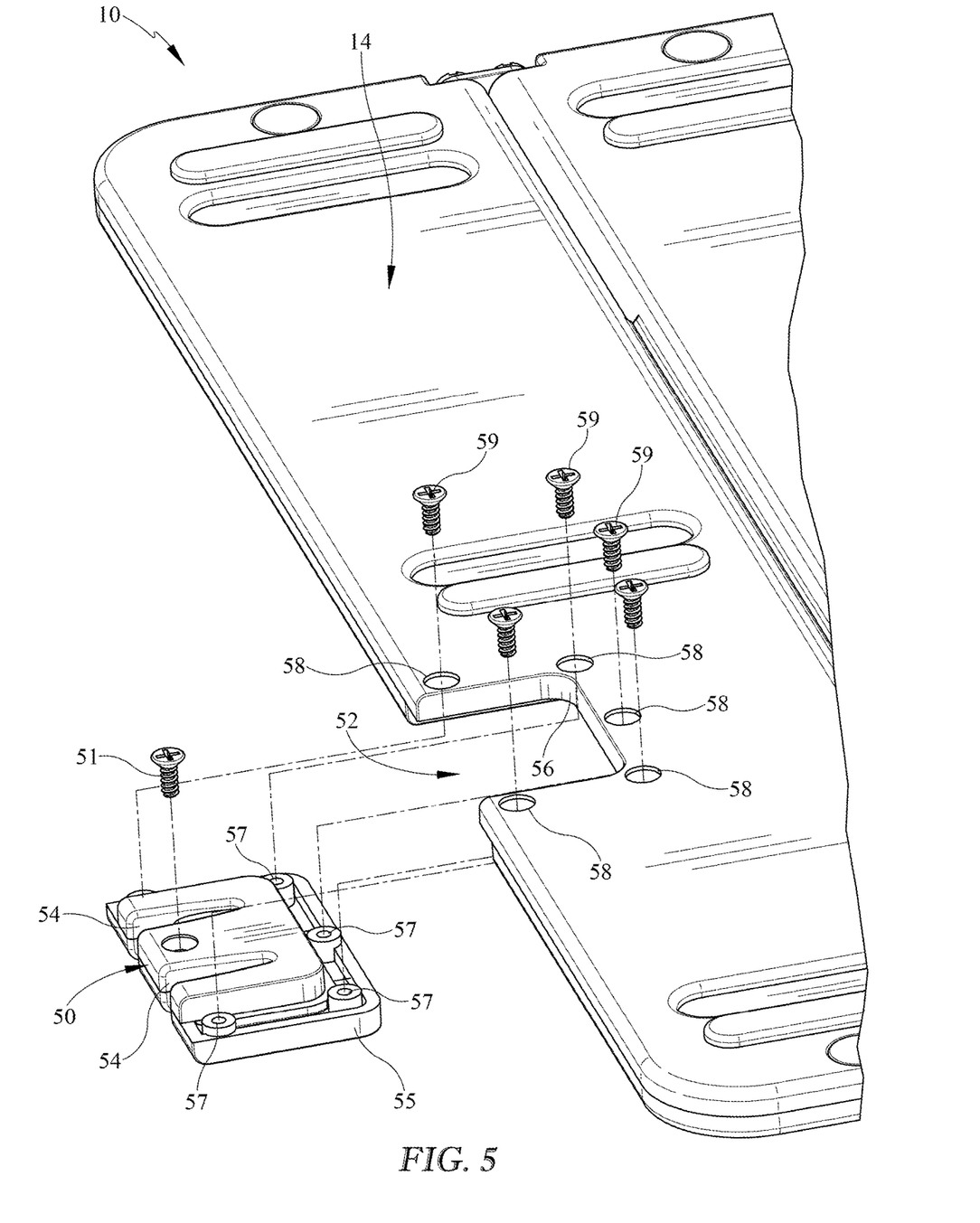

Referring now to FIG. 5, a perspective detail view of the knife sharpener 50 is shown. The sharpener 50 is shown spaced from the notch 52. The sharpener 50 includes mounting hardware 55 which overlaps an edge 56 within the notch 52. In some examples, disposed about the notch 52 are a plurality of fastener holes 58. The corresponding fasteners 59 are shown spaced above the fastener holes 58. The sharpener 50 may include a fastener 51 to attach the sharpener 50 to the hardware 55. The mounting hardware 55 may include a plurality of fastener holes 57 which are engaged by the fasteners 59 and capture the cutting board section 26 therebetween.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A foldable cutting board, comprising:
   a plurality of cutting board sections, each of said plurality of cutting board sections having a peripheral edge defining a plurality of sides;
   each of the plurality of cutting board sections having a cutting surface and an opposed bottom surface;
   pairs of said plurality of cutting board sections having adjacent parallel sides;
   a hinge defined by a first linkage and a second linkage extending between opposite ends of adjacent said pairs of said plurality of cutting board sections;
   each of said first and second linkages pivotally connected to one pair of said pairs of said plurality of cutting board sections;
   wherein the plurality of cutting board sections comprise at least three cutting board sections configured to fold in an accordion configuration; and,
   at least one seat and at least one foot on the bottom surface of each of said plurality of cutting board sections.

2. The foldable cutting board of claim 1, wherein the at least one foot of one of said plurality of cutting board sections is opposite the at least one seat of the adjacent of the pairs of the plurality of cutting board sections.

3. The foldable cutting board of claim 1 further comprising a knife sharpener.

4. The foldable cutting board of claim 3, said knife sharpener being a first knife sharpener and a second knife sharpener.

5. The foldable cutting board of claim 3, one of said plurality of cutting board sections comprising a notch.

6. The foldable cutting board of claim 5, said notch being located along the peripheral edge of said foldable cutting board.

7. The foldable cutting board of claim 6, said notch receiving said knife sharpener.

8. The foldable cutting board of claim 1, said plurality of cutting board sections comprising four sections.

9. A foldable cutting board, comprising:
   a plurality of cutting board sections, each of said sections having a score at ends; and,
   a hinge defined between adjacent pairs of said plurality of cutting board sections, said hinge defined by linkages pivotally connecting each adjacent section of each adjacent pair of said plurality of cutting board sections;
   wherein the plurality of cutting board sections comprise at least three cutting board sections configured to fold in an accordion configuration; and,
   further comprising a knife sharpener disposed in a notch, said notch located [in] at a perimeter edge of one section of said plurality of cutting board sections.

10. The foldable cutting board of claim 9, further comprising at least one foot on a lower surface of said plurality of cutting board sections.

11. The foldable cutting board of claim 10 further comprising at least one seat on the lower surface of each of said plurality of cutting board sections.

12. The foldable cutting board of claim 11 wherein the at least one foot of one of said plurality of cutting board sections is opposite the at least one seat of the adjacent of the pairs of the plurality of cutting board sections.

13. A foldable cutting board, comprising:
   a plurality of cutting board sections, each of said plurality of cutting board sections having a perimeter edge defining a plurality of sides;
   each of the plurality of cutting board sections having a cutting surface and an opposed bottom surface;
   pairs of said plurality of cutting board sections having adjacent parallel sides;
   a hinge defined by a first linkage and a second linkage extending between opposite ends of adjacent said pairs of said plurality of cutting board sections;
   said first linkage and said second linkage received in at least a first and second score located at ends of a first and second cutting board section of said plurality of cutting board sections;
   each of said first and second linkages pivotally connected to one pair of said pairs of said plurality of cutting board sections;
   wherein the plurality of cutting board sections comprise at least three cutting board sections configured to fold in an accordion configuration; and, a knife sharpener disposed at one of said perimeter edges of one cutting board section of said plurality of said cutting board sections.

\* \* \* \* \*